United States Patent [19]

Byron

[11] Patent Number: 4,962,903

[45] Date of Patent: Oct. 16, 1990

[54] COOLING METHOD AND APPARATUS FOR WINGS AND OTHER FUSELAGE COMPONENTS

[75] Inventor: David E. Byron, Casselberry, Fla.

[73] Assignee: Red Eye Arms, Inc., Winter Park, Fla.

[21] Appl. No.: 387,378

[22] Filed: Jul. 31, 1989

Related U.S. Application Data

[63] Continuation of Ser. No. 110,186, Oct. 19, 1987, abandoned.

[51] Int. Cl.⁵ .............................................. B64C 3/36
[52] U.S. Cl. .............................. 244/117 A; 244/207; 244/210; 416/95
[58] Field of Search ............... 244/210, 207, 208, 209, 244/214, 117 A, 57, 199; 417/151, 519; 416/91, 95; 165/44

[56] References Cited

U.S. PATENT DOCUMENTS

| | | | |
|---|---|---|---|
| 1,412,073 | 4/1922 | Wagenseil | 244/57 |
| 2,441,279 | 5/1948 | McCollum | 165/44 |
| 2,961,195 | 11/1960 | Bates | 244/211 |

FOREIGN PATENT DOCUMENTS

| | | | |
|---|---|---|---|
| 706599 | 4/1941 | Fed. Rep. of Germany | 244/57 |
| 646454 | 7/1928 | France | 244/57 |
| 957054 | 2/1950 | France | 244/210 |
| 57646 | 3/1953 | France | 244/199 |
| 2278568 | 2/1976 | France | 244/210 |
| 407530 | 3/1934 | United Kingdom | 125/44 |

*Primary Examiner*—Galen Barefoot
*Attorney, Agent, or Firm*—Edward M. Livingston

[57] ABSTRACT

A method and apparatus for eliminating heat build-up caused by air friction on wings and other air foils, especially common in high-speed aircraft. As an aircraft is moving, a small portion of air in the airstream moving by the wing or other air foil is passed through an air intake valve on the wing, into a Venturi section and then into a chamber within the wing or frame where the air is compressed naturally. Each Venturi section consists of a converging and diverging nozzle which creates a substantial cooling effect when the high speed air passes through it and is compressed and released. The intake valve spins or flips when hit by the airstream so it alternately intakes and exhausts the air through the Venturi section, thereby causing a double cooling effect. A second embodiment uses valves, one on the leading edge for air intake and the second near the back of the lower surface of the wing for air exhaust. When the front valve is open, high speed air flows through a Venturi section and into a compression chamber inside the wing. Once the air is sufficiently compressed, the front valve is closed and the rear valve opens causing the air to pass over a second Venturi section before being exhausted. This method and apparatus provides a passive cooling system to provide for a refrigeration effect. Such a cooling system will become very useful in high speed air travel, especially at hypersonic speeds.

7 Claims, 1 Drawing Sheet

COOLING METHOD AND APPARATUS FOR WINGS AND OTHER FUSELAGE COMPONENTS

This is a continuation of U.S. application Ser. No. 110,186, filed Oct. 19, 1987, now abandoned.

BACKGROUND OF THE INVENTION

This invention relates to air frame components and more particularly to a cooling system for wings and other components of planes and high-speed aircraft.

Planes, especially jets travelling at supersonic and hypersonic speeds, encounter substantial heat build-up on the leading edges of the wings and fuselage surface due to friction with the air. Such heat build-up results in only certain materials being usable for wings on such aircraft which can withstand the heat and be light enough for aircraft at the same time. This problem of heat build-up is particularly serious in the hypersonic aircraft and has been one of the major roadblocks to the perfection of a hypersonic airplane. Thus, there is a need for a cooling system which will reduce heat build-up on leading edges of wings and air frames when travelling at such high speeds.

The instant invention provides a cooling method and apparatus just for this purpose. There is no known prior art similar to the instant invention as it applies to leading edges of wings and other fuselage components. There exist refrigeration systems which might be utilized but such systems would add too much weight to aircraft. Contrary to these latter systems, the instant invention provides a cooling method and apparatus which is passive and lightweight. This method involves intaking air through valves on the leading edges of wings and fuselage surfaces, passing this air through a Venturi section consisting of converging and diverging nozzles and compressing it in a chamber within the wing or other aircraft component. When the air is sufficiently compressed within the chamber, the compressed air is then exhausted by passing it through the same Venturi section once again, or through a second Venturi section to the ambient air. In this manner, this invention yields a double cooling effect. One embodiment of the invention utilizes one valve which rotates to allow the intake and exhaust of air on a cycling basis. A second embodiment uses two spring-loaded or timed door-like valves, an intake valve at the leading edge and an exhaust valve in the bottom surface of the wing near the back. In the latter embodiment, the air entering the front valve passes through one Venturi section and enters a chamber where it is compressed. Once the air in the chamber has built up to sufficient pressure, it opens the back valve and the air passes through a second Venturi and out into the ambient airstream again. Thus, the second embodiment, in addition to creating a cooling effect, may also create a ram jet effect and thereby providing additional thrust or at least enough thrust to offset any drag caused by the effect of the front intake valve.

Thus, in this manner the instant invention provides a means of cooling the leading edges of wings and other aircraft components by passing ambient air at a velocity into valves through Venturi sections in the wings and other locations on the aircraft.

SUMMARY OF THE INVENTION

The main object of this invention is to provide a method and apparatus for cooling wings and other leading surfaces of aircraft.

A second object of the invention is to provide such a cooling method and apparatus which is passive.

Another object of the invention is to provide an apparatus to accomplish the cooling which is lightweight so as not to effect the weight of the aircraft.

An even further object of the invention is to provide such as apparatus which uses very few moving parts and is inexpensive to maintain and operate.

The instant invention accomplishes the above and other objects by providing a method of directing or passing airflow through one or a series of Venturi sections, with converging and diverging nozzles, in the leading edge of the wings and/or other fuselage surfaces to yield cooling of such surfaces. More specifically, air passes into valves, through the Venturi section and into a compression chamber, and once compressed passes out again through the same or a second Venturi section into the airstream.

The method and apparatus disclosed by this invention is passive and utilizes very few moving parts. In fact, both embodiments of the apparatus use only one or two moving parts, that is, valves to intake and exhaust air. In one embodiment, only one valve on the leading edge rotates to allow air intake and exhaust on a cycling basis. In the other embodiment two valves, one on the leading edge, intake air and the other near the back lower surface exhausts compressed air.

Furthermore, since only valves are used, the apparatus is lightweight, simple to install and easy to maintain.

Thus, this method and apparatus solves the problem of heat build-up due to air friction, especially common to high-speed aircraft, by providing a cooling method and apparatus for leading air foil edges.

The operation of the invention and other objects and advantages will become more readily apparent when the preferred embodiments are described in detail in conjunction with the drawings appended hereto.

BRIEF DESCRIPTION OF THE DRAWINGS

The drawings appended hereto are as follows.

DETAILED DESCRIPTION OF THE PREFERRED EMBODIMENTS

Figure 1:
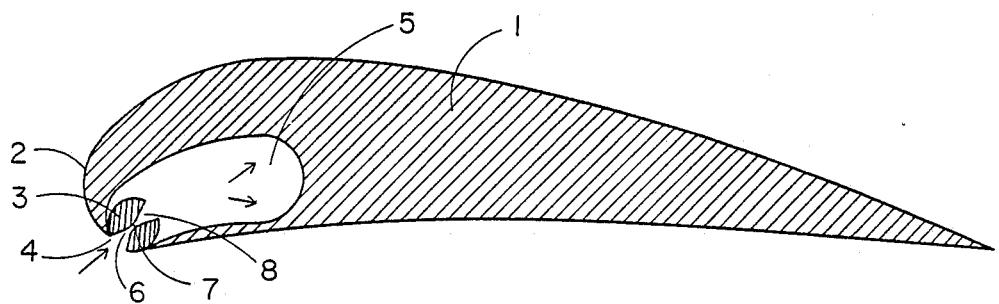
FIG. 1 is a cross-sectional view along the width of the wing of an aircraft showing the cooling apparatus during the intake cycle.
Figure 2:
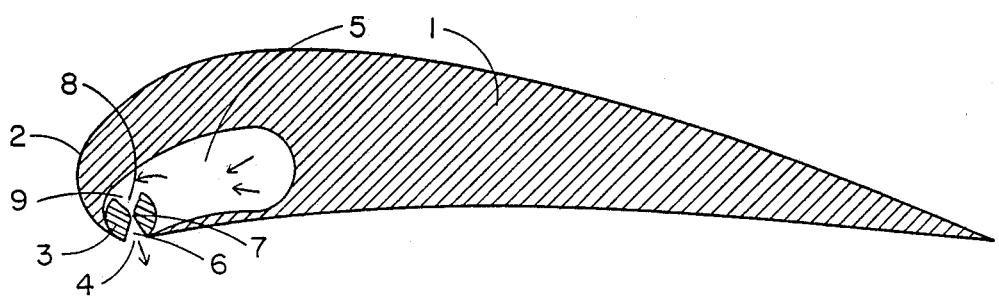
FIG. 2 is a cross-sectional view of the embodiment of FIG. 1 during the exhaust cycle.
Figure 3:
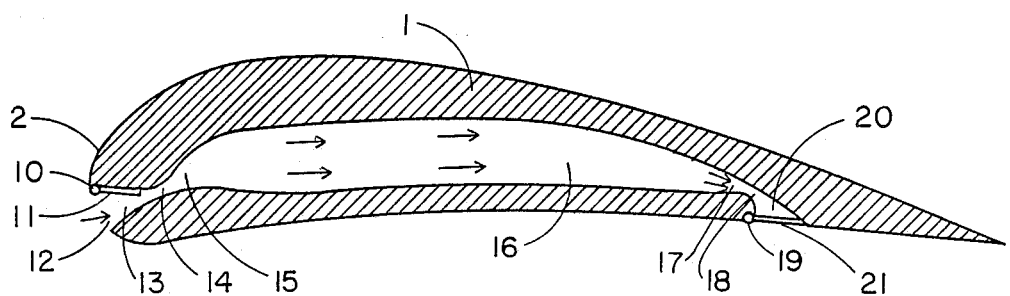
FIG. 3 is a cross-sectional view of another embodiment of the cooling apparatus during the intake cycle.
Figure 4:
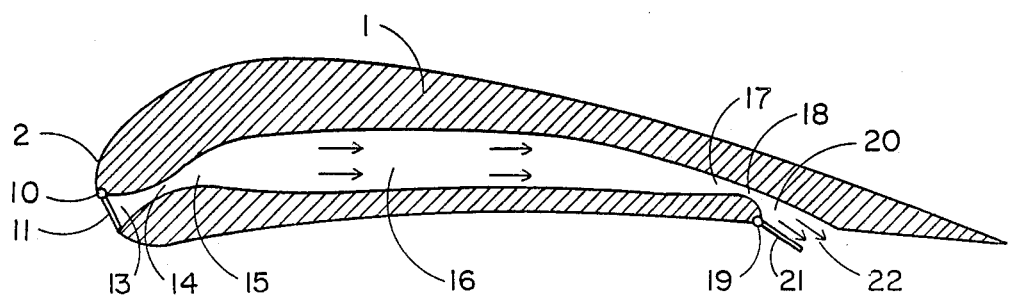
FIG. 4 is a cross-sectional view of the embodiment of FIG. 3 during the exhaust cycle.

Referring now in detail to the drawings, FIGS. 1 and 2 show one embodiment of the apparatus utilizing the cooling method, and FIGS. 3 and 4 show a second embodiment of an apparatus employing the cooling method of this invention.

In the cross-sectional view of FIG. 1, an air foil or wing 1 is shown in cross-section along its width. On the lower side of the leading edge 2 is a valve 3 which is preferably circular in nature and has the form of a cylinder if it runs the length of the leading edge of the air foil. During the intake cycle as shown in FIG. 1, the air intake port 4 in the valve 3 faces the airstream and allows air to pass into the valve 3 as indicated by the arrows and through the Venturi section contained in said valve 3, consisting of a converging nozzle 6, a narrow aperture 7 and diverging nozzle 8, and then into a compression chamber 5. During this intake cycle, a cooling effect is imparted to the air foil due to the rapid decrease in pressure of the air passing from the diverging nozzle 8 into the compression chamber 5. The air intake valve 3 spins, or rotates, from front to back due to the airstream hitting the port 4 at an angle. As the valve 3 spins, it reaches the position shown in FIG. 2 in which no air is passing into the intake port 4 and then the compressed air enters the exhaust port 9. In this position the air which now has been compressed tremendously within the compression chamber 5 so that it exceeds the pressure of the ambient air and passes in the direction of the arrows through the Venturi section in the valve 3 once again. In this manner, a second cooling of the wing or airframe component occurs. This cycle is repeated over and over again as the valve 3 spins and will continue so long as air is passing over the wing 1 at a high enough rate that it overcomes the friction between the outer surfaces of the valve 3 and the wing 1 against which it abuts. Ball-bearings may be used to reduce or set the desired amount of friction.

Thus, this first embodiment provides a double cooling effect as the air passes twice through the Venturi section. In addition to cooling a wing, this method will also cool the fuel normally stored within the wing which will prevent the need for refrigerant coils or other means for cooling the fuel in hypersonic aircraft.

The second embodiment of an apparatus which employs the cooling method of this invention is shown in the wing 1 of FIGS. 3 and 4. Again, the leading edge 2 of the air foil 1 contains an air intake port 12 through which air is taken in when the valve 11 is open. This valve 11 may be spring-loaded at 10 to allow the valve 11 to open only when the force of the air against it opens the valve 11. The air then passes through the port 12, then a Venturi section consisting of a converging nozzle 13, aperture 14 and diverging nozzle 15, and into a compression chamber 16 which may extend from front to back of the wing. Once the air within the compression chamber 16 is sufficiently compressed, the front valve 11 is closed and the back valve 21, which like the front valve 11 may be spring-loaded or electronically controlled at 19, opens, thereby allowing the compressed air to move in the direction of the arrows as shown in FIG. 4 through a second Venturi consisting of a converging nozzle 17, aperture 18 and diverging nozzle 20 out into the ambient air through the exhaust port 22. When the air is exhausted at high speed, another cooling effect occurs to the rear portions of the air foil 1.

Although the second embodiment of this apparatus has the disadvantage of occupying more space of the wing 1 than the first embodiment shown in FIGS. 1 and 2, it does have a few advantages over the first embodiment; one is that it may cool more of the wing or air foil surfaces than the first embodiment; and a second is that it provides a slight ram jet effect when the air is exhausted out the air exhaust valve 21. This slight ram jet effect, especially combined with the vacuum created behind the air foil due to air being removed from the airstream due to the invention, may actually increase airspeed and reduce fuel consumption.

Since the insertion of this apparatus utilizing this cooling method may adversely affect the lift provided by the wing due to interruption of the airstream, the air intake valves and exhaust valves are designed to be of small enough size and, purposely, are located below the leading edges of the wing such that there is very little effect on the air flow under the wing.

As described in detail hereinabove, it should be apparent that there has been provided a new, useful and nonobvious method and apparatus, two embodiments which have been illustrated and described, which will provide cooling for the leading edges of air foils, including wings and other aircraft components. This method and apparatus is unique in that it uses ambient air to provide passive cooling and has few moving parts, thereby being lightweight, easy and inexpensive to install, operate and maintain in an aircraft. Since the apparatus would involve the addition of only one or two valves and ball-bearings to an air foil made of almost any material similar to that used already in aircraft wings, the system is inexpensive.

This invention may be combined with other items to yield further benefits. For example, coils could be placed in the apparatus, such as in the diverging nozzle, to further increase and transmit cooling to other parts of an aircraft. Also, the air exhausted from the diverging nozzle of the Venturi could be passed over the blades of a turbine to power other aircraft components. Thus, the applications of this method and apparatus are numerous.

While two specific embodiments of the invention have been described in detail hereinabove and illustrated in drawings, it should be understood that various modifications may be made from the specific details described hereinabove without departing from the spirit and scope of the invention as set forth in the appended claims.

Having described in detail my invention, I claim the following:

1. A method of cooling the leading edges of wings and other airframe components comprising:
    taking ambient air from the airstream into the wings and other airframe components;
    passing the air through a Venturi section consisting of converging and diverging nozzles into a chamber;
    allowing the air in the chamber to become compressed and pressurized and then closing the Venturi section; and
    exhausting the air from the chamber by subsequently opening the same or another Venturi section into the ambient air.

2. An apparatus for cooling the leading edges of wings and other airframe components comprising:
    an air intake in a wing or other aircraft component which has means of opening and closing;
    a Venturi section consisting of a converging and diverging nozzle attached to said intake means;
    a chamber connected to the Venturi section in which the air flowing from the divering nozzle of the Venturi section is allowed to become compressed and pressurized; and
    an air exhaust in the wing or other aircraft component, having means of opening and closing, which is alternately closed when the air intake means is open to the air and opened when the air intake means is closed.

3. An apparatus for cooling the leading edges of wings and other aircraft components comprising:
    a single valve having an air intake port, said valve being a Venturi-like converging and diverging nozzle to intermittently allow the intake of air when the port is opened to the airstream and exhausting of air when the port is pointed away from the airstream; and a chamber connected to the single valve in which the air flowing from the diverging nozzle is allowed to become compressed and pressurized in said chamber prior to being exhausted.

4. An apparatus for cooling the leading edges of wings and other airframe components comprising:
- an air intake in the wing and other airframe components which has means of opening and closing;
- a Venturi section consisting of converging and diverging nozzles attached to said intake means;
- a chamber connected to the Venturi section in which the air flowing from the divering nozzle of the Venturi section is allowed to become compressed and pressurized;
- a second Venturi section attached to the back of said chamber; and
- an air exhaust behind the second Venturi section in the wing having means of opening and closing, which is alternately closed when the air intake means is open to the air and opened when the air intake means is closed.

5. The apparatus of claim 4 wherein the means of opening and closing the air intake comprises a valve.

6. The apparatus of claim 4 wherein the means of opening and closing the air exhaust comprises a second valve.

7. A method of cooling the leading edges of wings and other airframe components comprising:
- taking ambient air from the airstream into the wings and other airframe components;
- passing the air through a Venturi section consisting of converging and diverging nozzles into a chamber;
- allowing the air in the chamber to become compressed and pressurized and then closing the Venturi section; and
- exhausting the air from the chamber by subsequently opening the same or another Venturi section into another chamber to provide compressed air to power on-board equipment.

* * * * *